United States Patent

Smitmajer et al.

[15] 3,666,909
[45] May 30, 1972

[54] ARRANGEMENT FOR MOUNTING, ADJUSTMENT AND MAINTENANCE OF A CYLINDER IN A HORIZONTAL POSITION FOR DEPOSITING A LAYER ON ITS SURFACE, USING THE ELECTROSLAG METHOD

[72] Inventors: Zdenek Smitmajer; Pavel Blaskovits; Anton Krajmer, all of Bratislava; Jiri Jebas, Chomutov, all of Czechoslovakia

[73] Assignee: Vyskumny ustav zvaracsky, odborove veduce pracovisko zvarandia, Bratislava, Czechoslovakia

[22] Filed: Mar. 10, 1970

[21] Appl. No.: 18,124

[30] Foreign Application Priority Data

Mar. 13, 1969  Czechoslovakia.....................1804-69

[52] U.S. Cl....................................219/76, 219/73, 219/124
[51] Int. Cl..........................................................B23k 9/04
[58] Field of Search.......................219/73, 76, 124, 125 PL; 318/20.132, 20.150, 20.155; 118/321, 323, 6

[56] References Cited

UNITED STATES PATENTS

| | | |
|---|---|---|
| 1,884,644 | 10/1932 | Ford.....................................219/125 |
| 3,473,001 | 10/1969 | Pertel...................................219/125 |
| 3,021,419 | 2/1962 | Rascati.................................219/124 |
| 3,076,889 | 2/1963 | Enk......................................219/125 |
| 3,448,280 | 6/1969 | Blitchington, Jr. et al.........219/124 X |

Primary Examiner—J. V. Truhe
Assistant Examiner—J. G. Smith
Attorney—Arthur O. Klein

[57] ABSTRACT

An arrangement for depositing a metallic layer on the surface of a cylindrical object, for instance of a grooved roll of a rolling machine or of similar objects, provided with stable supporting means of a turn-table with the welding on device, and with a platform with supporting posts for supporting the cylinder in the horizontal position, adjustable in direction of the longitudinal axis of the cylinder, with the possibility to withdraw the whole platform from the welding-on position below the welding-on device.

2 Claims, 2 Drawing Figures

Patented May 30, 1972

INVENTORS:
Zdenek SMITMAJER
Pavel BLASKOVITS
Anton KRAJMER
Jiri JEBAS
BY: Arthur O. Klein
ATTORNEY

ARRANGEMENT FOR MOUNTING, ADJUSTMENT AND MAINTENANCE OF A CYLINDER IN A HORIZONTAL POSITION FOR DEPOSITING A LAYER ON ITS SURFACE, USING THE ELECTROSLAG METHOD

BACKGROUND OF THE INVENTION

This invention relates to an arrangement for supporting, adjusting and maintenance of a cylinder in a horizontal position, particularly a grooved roll for rolling machines, in the course of depositing a metallic layer on its surface by an electroslag welding process.

Actually used arrangements for supporting, adjusting and maintenance of cylinders in a horizontal position for this purpose have been provided with supporting means for the cylinder, fixed to a stable frame or stand. This supporting means had with respect to the frame of the whole arrangement a stable center and after seating the cylinder, the center of the welding on device, generally mounted on a turn-table, has been adjusted with respect of the center of the cylinder. The turn-table or some other device supporting the welding on device has been mounted on guidings, for instance on guiding slides parallel with the longitudinal axis of the cylinder in its welding on position. The turn-table has been by means of a guiding mounted on a stand for instance on one or more poles fixed to the frame so that it was possible to adjust the turn-table vertically and transverse to the longitudinal axis of the cylinder. The adjustment of the welding wire or wires into the position for starting the welding on process and for maintenance of the relative position of the welded-on cylinder and of the welding wire or wires has been accomplished in this case by manipulation with the turn-table. A drawback of this design is that the described mounting of the turn-table on a mobile device reduces the stiffness of the turn-table. A lack of stiffness of the turn-table causes vibrations of the electrodes feeding the welding wires of the welding-on device fixed on the turn-table. Due to said vibrations of the welding electrodes the minimum possible thickness of the welded on layer is reduced and when welding in a narrow gap there is the danger of contact of the welding electrodes with the fundamental material or with the welding plate, what is undesirable or frequently prohibitive. When adjusting for instance the position of the welding plates undesirable material can be molten away into the welding pool and can depreciate the final product.

Another drawback of actually known arrangements for mounting of cylinders into a welding on position has been, that due to the stable supporting means of the cylinder below the turn-table there was a danger of damaging the turn-table or the welding on device in the course of manipulation with the cylinder when placing it on the supporting means. The turn-table is rather sensitive to accidental shocks and to rough mechanical handling.

SUMMARY OF THE INVENTION

It is an object of this invention to provide means for a safe mounting and correct adjusting of a cylinder in a horizontal position for a welding on operation.

There is another object of this invention to enable an easy and safe seating this cylinder on its supports without damaging the welding devices or their supports in the course of this operation.

It is furthermore an object of this invention to secure the required stiffness of the whole arrangement in order to achieve perfect welding conditions.

The arrangement according to this invention eliminates the said drawbacks by the major part by mounting the turn-table supporting the welding on device vertically shiftably on pillars, fixed to the machine frame and by providing a platform with supporting posts for supporting the cylinder, mounted slidably with respect to the machine frame in direction of the longitudinal axis of the cylinder.

In order to protect the turn-table from damaging when seating the cylinder on its supporting posts, said platform is arranged slidably in direction of the longitudinal axis of the cylinder on an auxiliary element, for instance on a truck or some other carrying means, arranged slidably with respect to the machine frame in a direction perpendicularly to the longitudinal axis of the cylinder and provided with means for firm fastening to said machine frame. This arrangement enables that the truck or some other carrying means carrying the platform with supporting posts for the cylinder, can be removed from its place below the turn-table perpendicularly to the longitudinal axis of the cylinder, so that the cylinder can be seated on its supporting posts in this drawn away position and after return of the platform into its position below the turn-table, the truck can be fixed to the machine frame or to its part by some known means, for instance by screw bolts.

It is advantageous to provide a driving mechanism, for instance an electric motor for the adjustment of the cylinder to its proper welding-on position at the start of the process.

DESCRIPTION OF THE DRAWINGS

The attached drawings illustrate on one exemplary embodiment the main features of this invention.

DESCRIPTION OF PREFERRED EMBODIMENT

Figure 1:
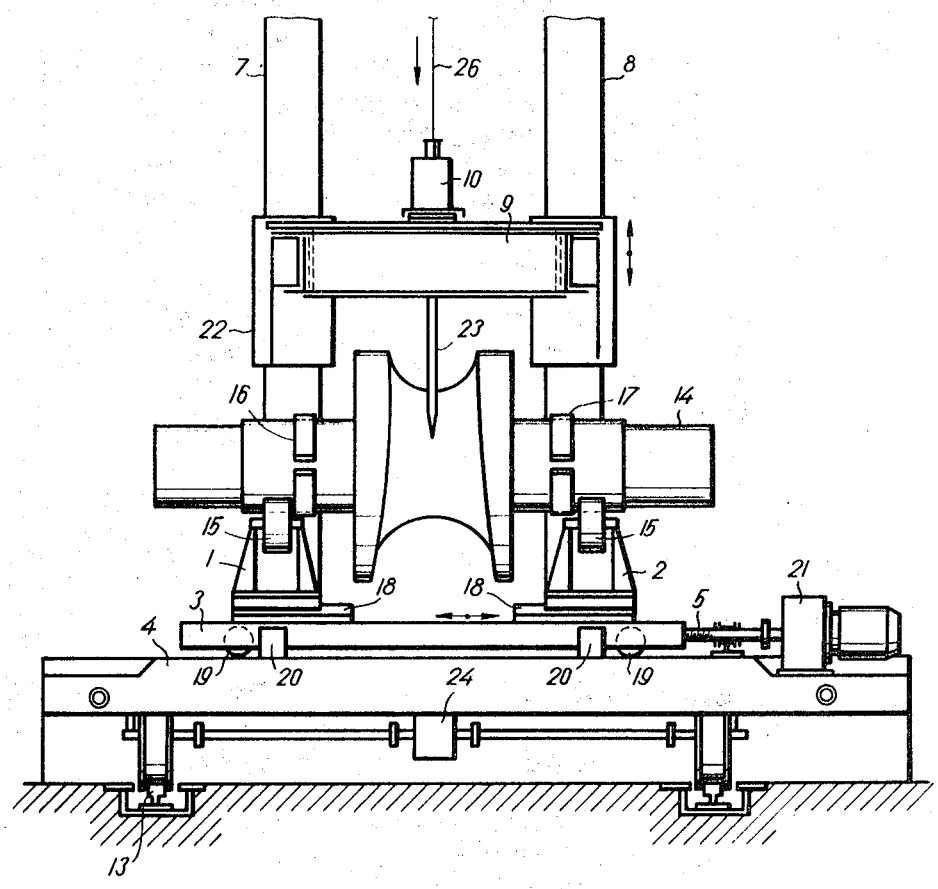
FIg. 1 shows the arrangement in elevation
FIG. 2 the same arrangement in side view.
Figure 2:
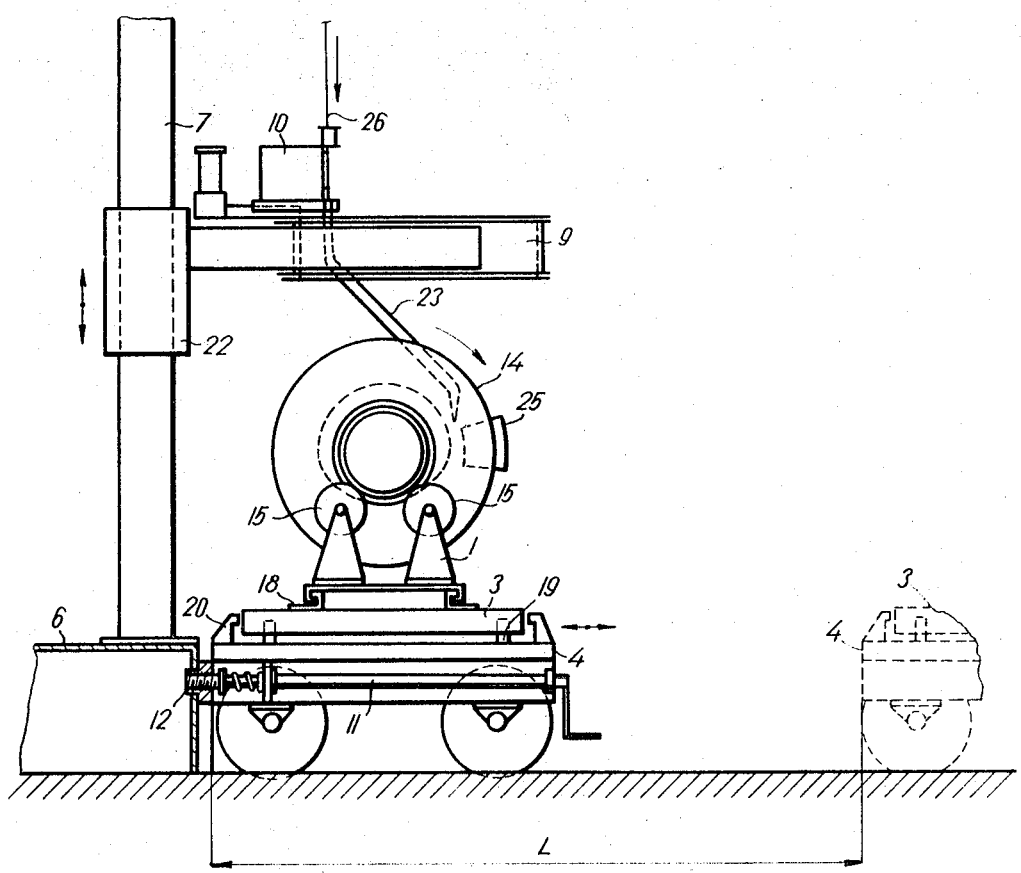

A cylinder 14 for instance a grooved roll of a rolling machine, the operating surface of which has to be welded on, using the electroslag method, is placed on supporting posts 1 and 2, mounted on a platform 3. The supporting posts 1, 2 are provided with rotatable rollers 15 enabling a free turning of the welded on cylinder 14 seated on said posts 1, 2. Its position in the longitudinal direction is determined by longitudinally divided sleeves 16, 17 fixed on the left and right pin respectively of the cylinder 14, which sleeves 16, 17 engage with the lateral faces of the rollers 15. The supporting posts 1, 2 are mounted on the platform 3 on prismatic guidings 18. The platform 3 itself, which can be shifted in the direction of the longitudinal axis of the cylinder, is mounted on a truck 4 capable to be withdrawn from the main frame 6, that is from the operating position for the distance L. This withdrawal enables a safe seating of the cylinder 14 on the supporting posts 1, 2. In the welding on position, the truck 4 is firmly connected to the frame 6 by fastening means consisting for instance of a resiliently mounted screw bolt 11 and of a nut 12 fixed to the frame 6. The truck 4 can be moved on a track 13 and can be automatically driven by an electric motor 24. Pillars 7 and 8 are fixed on the frame 6 with a sliding frame 22 supporting a turn-table 9 guided vertically on said pillars 7, 8. The turn-table 9 is rotatably mounted on the sliding frame 22 and is provided with welding on units 10 with electrodes 23 adapted for feeding welding wires 26 in the center of a welding-on gap created between the surface of the cylinder 14 to be treated and a welding plate 25. The number of welding-on units 10 is determined by the size of the treated cylinder 14 and by its profile.

The shiftable platform 3 is mounted on the truck 4 by means of rollers 19 and is simultaneously guided in guidings 20. The adjustment of the position of the platform 3 is accomplished by the screw bolt 5 driven from a driving device 21 fixed on the frame of the truck 4. By turning the screw bolt 5, the relative position of the platform 3 and of the truck 4, can be adjusted and thus also the position of the cylinder 14 with respect to the center of the turn-table 9, as first axial position is determined by the supporting posts 1, 2 mounted on the shiftable platform 3 and the truck 4 is in its operating position firmly connected with the frame 6, on the pillars 7, 8 of which the turn-table 9 is mounted inadjustably in direction of the longitudinal axis of the welded-on cylinder 14.

The welded on cylinder 14 is seated on the supporting posts 1, 2 while the truck 4 is withdrawn for a distance, determined by the dimensions of the truck and on the turn-table so as to enable a safe seating of the cylinder beyond reach of the proper welding-on means, that is of the turn-table and of the welding-on units, so that the cylinder can be easily deposited on the supporting posts. The truck 4 is thereafter shifted towards the frame 6 and mechanically connected therewith by means of the screw bolt 11 and of the nut 12, securing thus the position of the truck 4 with respect to the frame 6. By shifting the platform 3 by means of the screw bolt 5 the cylinder 14 is shifted in direction of its longitudinal axis enabling thus an adjustment of the center of the welded-on part of the cylinder 14 with respect to the center of the turn-table 9.

It is obvious that an auxiliary platform or some other auxiliary carrying means, mounted slidably with respect to the machine frame can be used instead of the truck 4.

We claim:

1. An arrangement for mounting, adjustment and maintenance of a grooved cylinder in a horizontal position for depositing a metallic layer on the groove in the cylinder surface by welding, using the electroslag method, comprising in combination a machine frame,
   pillars fixed to said machine frame,
   a turn-table,
   means supporting said turn-table for vertical movement on said pillars and secured against lateral movement thereby,
   a welding device mounted on said turn-table for cooperation with the surface of the groove in the cylinder,
   a platform with supporting posts for supporting the cylinder in a horizontal position under said welding device, said platform being mounted to slide with respect to said machine frame in the direction of the longitudinal axis of the cylinder, means for sliding said platform with respect to said machine frame.

2. An arrangement as claimed in claim 1 provided with auxiliary carrying means arranged to slide horizontally on the machine frame perpendicularly to the longitudinal axis of the cylinder, means for firmly fastening said carrying means to said machine frame,
   the platform with supporting posts for supporting the cylinder being mounted to slide on said auxiliary carrying means in the direction of the longitudinal axis of the cylinder, means to slide the platform and supporting posts on said auxiliary carrying means.

* * * * *